(12) United States Patent
Aboyoussef et al.

(10) Patent No.: US 6,339,526 B1
(45) Date of Patent: Jan. 15, 2002

(54) LOW VOLTAGE CUTOFF CIRCUIT WITH SHORT CIRCUIT DETECTION CAPABILITY AND METHOD OF OPERATION THEREOF

(75) Inventors: Ahmed Aboyoussef, Wall; Frank D. Bannon, III, Ocean, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/354,821

(22) Filed: Jul. 16, 1999

Related U.S. Application Data

(63) Continuation of application No. 09/108,849, filed on Jul. 1, 1998, now abandoned.

(51) Int. Cl.[7] .......................... H02H 3/24; G01R 31/08
(52) U.S. Cl. .......................... 361/92; 361/78; 327/527
(58) Field of Search .................. 361/93.1, 90, 91.1, 361/91.3, 93.9, 86, 88, 92, 78, 98, 100; 307/80, 85; 324/500, 512, 522, 527

(56) References Cited

U.S. PATENT DOCUMENTS

| | | | | |
|---|---|---|---|---|
| 4,127,886 A | * | 11/1978 | Easter | 361/18 |
| 4,954,917 A | * | 9/1990 | Wirth | 361/98 |
| 5,151,841 A | * | 9/1992 | Knights | 361/86 |
| 5,596,465 A | * | 1/1997 | Honda et al. | 361/18 |
| 5,748,428 A | * | 5/1998 | Kelley et al. | 361/94 |
| 5,973,419 A | * | 10/1999 | Kruppa et al. | 307/131 |

* cited by examiner

Primary Examiner—Kim Huynh

(57) ABSTRACT

A low voltage cutoff circuit, a method of operating the same and a battery backup system incorporating the low voltage cutoff circuit or the method. In one embodiment, the low voltage cutoff circuit includes: (1) a low voltage monitor coupled between an input and an output of the low voltage cutoff circuit, (2) a cutoff switch, coupled between the input and the output and controlled by the low voltage monitor, that closes to couple the input to the output, the cutoff switch subject to failing closed when a voltage of the input is below a threshold and a load couplable to the output contains a short circuit and (3) a short circuit protection circuit, coupled to the low voltage monitor, that senses when the load contains the short circuit and directs the low voltage monitor to prevent the cutoff switch from closing.

20 Claims, 2 Drawing Sheets

LOW VOLTAGE CUTOFF CIRCUIT WITH SHORT CIRCUIT DETECTION CAPABILITY AND METHOD OF OPERATION THEREOF

This is a continuation of U.S. patent application Ser. No. 09/108,849, filed on Jul. 1, 1998, but since abandoned entitled "LOW VOLTAGE CUTOFF CIRCUIT WITH SHORT CIRCUIT DETECTION CAPABILITY AND METHOD OF OPERATION THEREOF," to Ahmed Aboyussef, et al., which is incorporated herein by reference.

TECHNICAL FIELD OF THE INVENTION

The present invention is directed, in general, to battery backup systems and, more specifically, to a low voltage cutoff circuit with short circuit detection capability, a method of operating the same and a battery backup system incorporating the circuit or method.

BACKGROUND OF THE INVENTION

Commonly, many existing battery backups for telecommunications systems do not possess circuitry for protecting the system from low voltage or undervoltage conditions. In such systems, a main power source goes off-line and a battery backup supplies power necessary for system operation. While operating on backup power, the overall voltage supplied by the batteries will slowly drop. Once the backup voltage drops below a known level, irreversible battery damage occurs.

To combat this problem, various new battery backup systems contain sensing equipment that monitors a load voltage. When operating on backup power, the sensing equipment monitors the load voltage via sense leads in a feedback-based configuration. Once this load voltage drops to an unacceptable level, the entire system, including the battery backup is shut down.

Problems with these systems stem from an economic and service origin. To implement such battery backups, users would be required to replace existing backups with the new systems. This option is, from a cost standpoint, completely unacceptable. Further, in order to replace the backups, the associated telecommunications equipment would most likely suffer repeated interruptions.

Another option to overcome the problems associated with low voltage or undervoltage conditions includes placing modules containing sensing equipment that monitors battery voltages from the load. Once the supplied battery voltage drops to an unacceptable level, the load or loads are disconnected.

A reoccurring problem encountered in these modules involves the device used to interrupt the telecommunications system. The device used to interrupt the battery voltage to the load is typically a field effect transistor (FET). A FET is commonly used since it is very small and more reliable compared to electromechanical counterparts. The problem with low voltage cutoff traditionally lies in short circuit protection upon power-up. If a short circuit were applied to the load side of the module after power up, the fuse would blow and the system would shut down. If the short circuit were to remain on the load or if there was an unknown short circuit on the load prior to power-up, the FET would be destroyed when the module attempts to apply the battery voltage to the load. This is commonly termed a "silent failure." The FET fails in a shorted condition, battery voltage continues to be delivered to the load, almost certainly damaging circuit elements throughout the module. The user is not aware of the failure until the battery plant voltage becomes too low and the system as a whole fails.

Accordingly, what is needed in the art is a way to protect against such "silent failures."

SUMMARY OF TEE INVENTION

To address the above-discussed deficiencies of the prior art, the present invention provides a low voltage cutoff circuit, a method of operating the same and a battery backup system incorporating the low voltage cutoff circuit or the method. In one embodiment, the low voltage cutoff circuit includes: (1) a low voltage monitor coupled between an input and an output of the low voltage cutoff circuit, (2) a cutoff switch, coupled between the input and the output and controlled by the low voltage monitor, that closes to couple the input to the output, the cutoff switch subject to failing closed when a voltage of the input is below a threshold and a load couplable to the output contains a short circuit and (3) a short circuit protection circuit, coupled to the low voltage monitor, that senses when the load contains the short circuit and directs the low voltage monitor to prevent the cutoff switch from closing.

The present invention therefore introduces the broad concept of protecting a cutoff switch as against a potentially harmful overcurrent condition that a short circuit in a load may cause. The overcurrent condition, which could cause the cutoff switch to fail closed, is avoided by preemptively preventing the cutoff switch from closing when a short circuit in the load is detected.

In one embodiment of the present invention, the cutoff switch is a field-effect transistor (FET). Those skilled in the art are aware of the tendency of FETs to fail closed under overcurrent conditions. However, those skilled in the art should understand that the present invention is fully employable with other types of cutoff switches, such as electromechanical relays, which may also be subject to failing closed.

In one embodiment of the present invention, the short circuit protection circuit comprises a short circuit sensor that is noninvasive with respect to the load. A "noninvasive" sensor is defined for purposes of the present invention as a sensor that does not require a resistor or other device to be series-coupled with the load. A current transformer is noninvasive, but an in-line diode is not. Of course, the broad scope of the present invention is not limited to noninvasive sensors.

In one embodiment of the present invention, the low voltage monitor opens the cutoff switch only when the voltage of the input is less than the threshold. In an embodiment to be illustrated and described, a fuse is located between the source and the low voltage monitor. When the voltage of the input is at or above the threshold, it is desired to blow the fuse rather than open the cutoff switch. Of course, the cutoff switch can be opened after the fuse blows or instead of blowing the fuse.

In one embodiment of the present invention, the low voltage cutoff circuit further includes a power filter coupled between the input and the cutoff switch. Those skilled in the art are familiar with the structure and function of power filters.

In one embodiment of the present invention, the low voltage cutoff circuit nominally carries electric power at about 48 volts and the threshold is less than about 45 volts. The 48 volt nominal operating voltage is typical for operating telecommunications equipment. A 43 volt threshold is advantageous in the embodiment to be illustrated and described.

In one embodiment of the present invention, a source of electrical power is coupled to the input. In the embodiment to be illustrated, the source is at least one battery.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following description taken in conjunction with the accompanying drawing, in which.

the FIG. 1 illustrates a block diagram of a battery backup system that incorporates a low voltage cutoff circuit having short circuit detection capability constructed according to the principles of the present invention.

DETAILED DESCRIPTION

Battery backup systems commonly employ voltage cutoff modules that consist of a power filter and a low voltage cutoff circuitry. These modules are placed between a voltage-supplying battery plant, a fuse and a system load for monitoring disconnect. The voltage cutoff module protects the batteries, which usually supply about 48 volts, from excessive currents under low voltage conditions.

The power filter receives input power from the battery plant and filters the voltage to protect the system from random noise, transient power surges, fluctuations, etc. The low voltage cutoff circuitry is coupled to the output of the power filter and consists of a low voltage monitor coupled to a cutoff switch. The low voltage monitor observes the voltage supplied by the battery, as filtered by the power filter. If for any reason the battery output voltage drops too low (commonly about 38.5 volts), the low voltage monitor forces the cutoff switch to open, thus decoupling the battery feed from the load. Ordinarily, upon power-up or reconnection of power to the system, the module does not apply power to the load until the battery plant output is greater than or equal to approximately 43 volts.

The device used to interrupt the battery voltage to the load is typically a field effect transistor (FET). A FET is commonly used since it is very small and more reliable compared to its electromechanical counterparts.

This module, though useful in many applications, does not protect the system in cases of short circuit during power-up. If a short circuit occurred after power-up, the fuse would blow and the system would shut-down. In cases where there was an unknown short circuit on the load prior to power-up, the cutoff switch would fail to decoupled the load when the module attempts to apply the battery voltage. The cutoff switch fails in a shorted condition, thereby continually delivering battery voltage to the load, almost certainly damaging or destroying circuit elements throughout. Most importantly, the user is not aware of the failure until the battery plant voltage becomes too low and the system as a whole fails.

Figure 1:
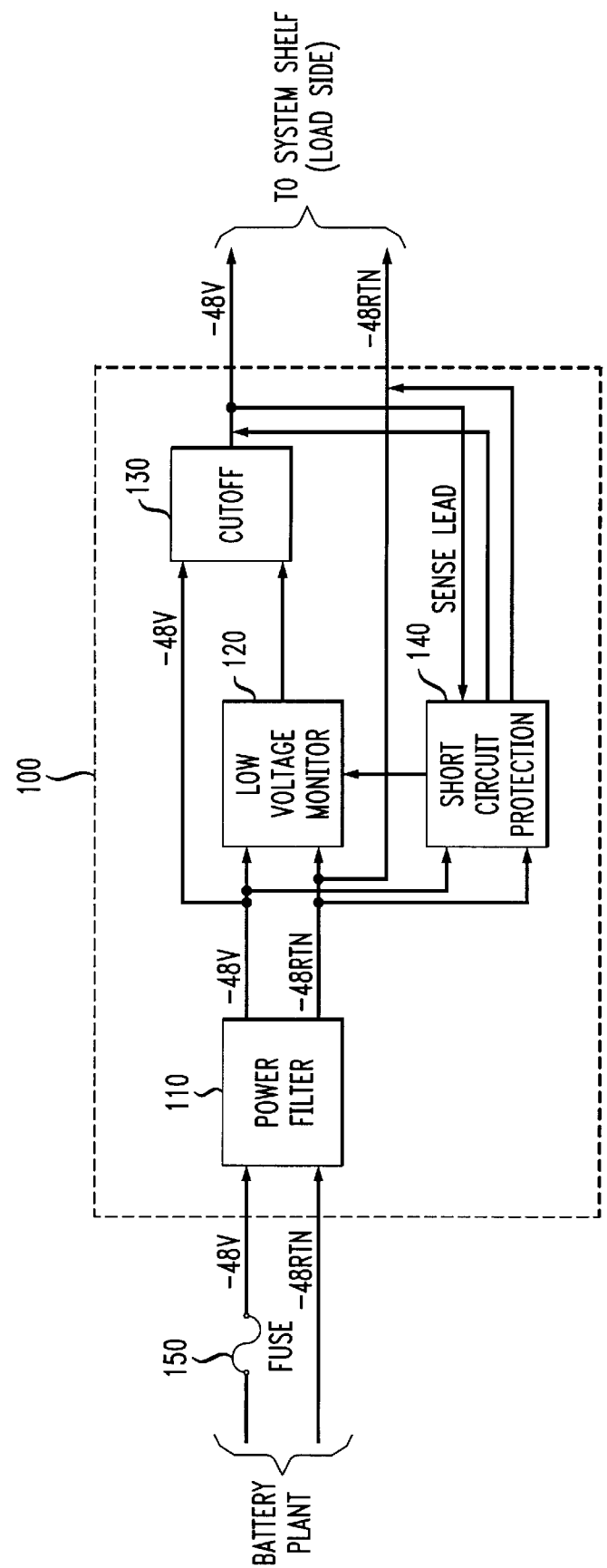

Referring to the FIG. 1 illustrated is a block diagram of a battery backup system that incorporates a low voltage cutoff circuit having short circuit detection capability constructed according to the principles of the present invention. The low voltage cutoff circuit 100 receives input voltage from a source of electrical power, commonly a battery plant, and, under proper conditions, delivers that voltage to a load.

The low voltage cutoff circuit 100 includes a power filter 110, which receives the input voltage, coupled to a low voltage monitor 120 and the load.

A cutoff switch 130 is coupled between the power filter 110 and the load. The cutoff switch 130 also receives control signals from the low voltage monitor 120 and opens to disconnect the load from the power filter 110 when the battery voltage drops below a preset threshold level. In a preferred embodiment, the preset threshold level is less than about 45 volts. In another preferred embodiment, the cutoff switch 130 is a field-effect transistor (FET). As with the previous module, this switch is subject to failing in a closed state when the input voltage is below the preset threshold level and the load contains a short circuit.

Additionally, a short circuit protection circuit 140 detects a short circuit in the load and is also coupled to the low voltage monitor 120 for sending feedback signals. The short circuit protection circuit 140 is capable of supplying a sense current to the load prior to the closing of the cutoff switch 130 and senses the current between the cutoff switch 130 and the load to determine if a short circuit exists in the load. When the short circuit protection circuit 140 detects that the load contains a short circuit, it signals the low voltage monitor 120 to prevent the cutoff switch 130 from closing, thus not connecting the load. In yet another preferred embodiment, when the short circuit protection circuit 140 senses a short circuit, the short circuit protection circuit 140 signals the low voltage monitor 120 to force the fuse 150 to blow rather than signal the cutoff switch 130 to remain open.

Figure 2:
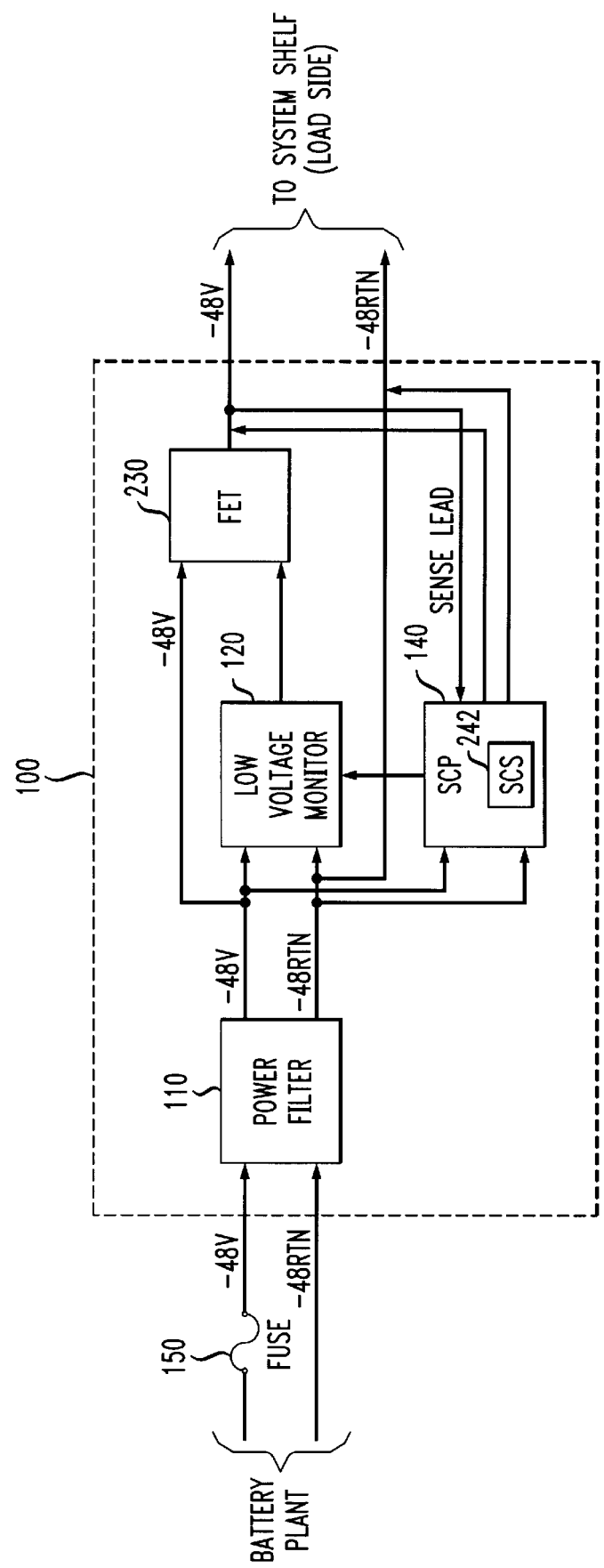
FIG. 2 illustrates a block diagram of another embodiment of the battery backup system of FIG. 1 constructed according to the principles of the present invention.

Turning now to FIG. 2, illustrated is a block diagram of another embodiment of the battery backup system of FIG. 1 constructed according to the principles of the present invention. In the illustrated embodiment, the low voltage cutoff circuit 100 includes a field-effect transistor 230 as a cutoff switch. Additionally, the short circuit protection circuit 140 includes a short circuit sensor 242 that is noninvasive with respect to the load. One skilled in the pertinent art is familiar with and the use of noninvasive sensors. Of course, however, other types of sensors used to detect a short circuit are within the broad scope of the present invention.

Although the present invention has been described in detail, those skilled in the art should understand that they can make various changes, substitutions and alterations herein without departing from the spirit and scope of the invention in its broadest form.

What is claimed is:

1. A low voltage cutoff circuit having an input and an output couplable to a load, comprising:
   a cutoff switch configured to close to couple said input to said output;
   a low voltage monitor that monitors a voltage at said input and causes said cutoff switch to close when said voltage is at or above a threshold and open when said voltage is below said threshold; and
   a short circuit protection circuit, operable prior to a closing of said cutoff switch, that senses a short circuit in said load and directs said low voltage monitor to prevent said cutoff switch from closing.

2. The low voltage cutoff circuit as recited in claim 1 wherein said cutoff switch is a field-effect transistor (FET).

3. The low voltage cutoff circuit as recited in claim 1 wherein said short circuit protection circuit comprises a short circuit sensor that is noninvasive with respect to said load.

4. The low voltage cutoff circuit as recited in claim 1 further comprising a power filter coupled between said input and said cutoff switch.

5. The low voltage cutoff circuit as recited in claim 1 wherein said low voltage cutoff circuit nominally carries electric power at about 48 volts and said threshold is less than about 45 volts.

6. The low voltage cutoff circuit as recited in claim 1 wherein a source of electrical power is coupled to said input.

7. The low voltage cutoff circuit as recited in claim 1 wherein said low voltage cutoff circuit is part of a battery backup system and said short circuit protection circuit is only operable during a power-up period of said battery backup system.

8. A method of protecting a battery backup system having a battery and couplable to a load, comprising:

controlling a cutoff switch configured to close to couple said battery to said load;

monitoring a battery voltage with a low voltage monitor;

causing said cutoff switch to close when said battery voltage is at or above a threshold and open when said battery voltage is below said threshold;

sensing when said load contains a short circuit prior to closing said cutoff switch; and directing said low voltage monitor to prevent said cutoff switch from closing when said load exhibits said short circuit.

9. The method as recited in claim 8 wherein said cutoff switch is a field-effect transistor (FET).

10. The method as recited in claim 8 wherein said sensing comprises noninvasively sensing said short circuit.

11. The method as recited in claim 8 further comprising filtering said battery voltage with a power filter between said input and said cutoff switch.

12. The method as recited in claim 8 wherein said battery voltage is about 48 volts and said threshold is less than about 45 volts.

13. The method as recited in claim 8 further comprising coupling a fuse between said battery and said low voltage monitor.

14. The method as recited in claim 8 wherein said sensing and said directing only occurs during a power-up period of said battery backup system.

15. A battery backup system for telecommunications equipment, comprising:

a battery;

a fuse coupled to said battery; and a low voltage cutoff circuit having an input coupled to said fuse and an output couplable to a load, including:

a cutoff switch configured to close to couple said input to said output;

a low voltage monitor that monitors a voltage at said input and causes said cutoff switch to close when said voltage is at or above a threshold and open when said voltage is below said threshold; and a short circuit protection circuit, operable prior to a closing of said cutoff switch, that senses a short circuit in said load and directs said low voltage monitor to prevent said cutoff switch from closing.

16. The battery backup system as recited in claim 15 wherein said cutoff switch is a field-effect transistor (FET).

17. The battery backup system as recited in claim 15 wherein said short circuit protection circuit comprises a short circuit sensor that is noninvasive with respect to said load.

18. The battery backup system as recited in claim 15 wherein said low voltage cutoff circuit further includes a power filter coupled between said input and said cutoff switch.

19. The battery backup system as recited in claim 15 wherein said battery nominally provides electric power at about 48 volts and said threshold is less than about 45 volts.

20. The battery backup system as recited in claim 15 wherein said short circuit protection circuit is only operable during a power-up period of said battery backup system.

* * * * *